US010222782B2

(12) United States Patent
Oohashi et al.

(10) Patent No.: US 10,222,782 B2
(45) Date of Patent: Mar. 5, 2019

(54) PARAMETER-BASED CONTROLLER FOR MANAGING TOOL LIFE CONSIDERING CHANGE IN MACHINING CONDITIONS

(71) Applicant: FANUC Corporation, Yamanashi (JP)

(72) Inventors: Takumi Oohashi, Yamanashi (JP); Kazuo Sato, Yamanashi (JP); Hideaki Maeda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 199 days.

(21) Appl. No.: 15/181,453

(22) Filed: Jun. 14, 2016

(65) Prior Publication Data

US 2016/0363925 A1    Dec. 15, 2016

(30) Foreign Application Priority Data

Jun. 15, 2015    (JP) .................................. 2015-120194

(51) Int. Cl.
*G05B 19/4065*    (2006.01)
(52) U.S. Cl.
CPC ................. *G05B 19/4065* (2013.01)
(58) Field of Classification Search
CPC ...... G05B 19/4065; G05B 2219/37228; G05B 2219/37256; G05B 2219/45044; G05B 2219/37249; G05B 2219/37252
USPC ......................................................... 700/175
See application file for complete search history.

(56) References Cited

U.S. PATENT DOCUMENTS

| 4,497,029 A | * | 1/1985 | Kiyokawa ............ G05B 19/182 318/563 |
| 5,571,957 A | | 11/1996 | Tanaka |
| 6,021,360 A | * | 2/2000 | Barker ............. G05B 19/41865 700/174 |
| 6,584,415 B1 | | 6/2003 | Uneme et al. |
| 7,010,386 B2 | * | 3/2006 | McDonnell ........ G05B 19/4065 700/175 |
| 2002/0002419 A1 | | 1/2002 | Yamazaki et al. |
| 2004/0193307 A1 | * | 9/2004 | Fujishima .......... G05B 19/4065 700/177 |

(Continued)

FOREIGN PATENT DOCUMENTS

| CN | 1329968 A | 1/2002 |
| CN | 101770222 A | 7/2010 |

(Continued)

OTHER PUBLICATIONS

Decision to Grant a Patent in JP Application No. 2015-120194, dated Jul. 18, 2017, pp. 6.

(Continued)

*Primary Examiner* — Chun Cao
(74) *Attorney, Agent, or Firm* — Hauptman Ham, LLP

(57) ABSTRACT

A numerical controller determines a consumption factor representing the degree to which a tool included in a machine tool consumes the life in association with machining conditions, and calculates a tool life (accumulated consumption life) consumed before each block based on the determined consumption factor and a tool usage for each block. If a command of a block read from a machining program is a tool change command, a tool having a tool life not ending before the next tool change command is selected among tools based on the accumulated consumption life.

4 Claims, 7 Drawing Sheets

(56) References Cited

U.S. PATENT DOCUMENTS

2012/0310397 A1* 12/2012 Rataul .............. G05B 19/41805
 700/95
2016/0047223 A1* 2/2016 Li ....................... E21B 47/0006
 702/9

FOREIGN PATENT DOCUMENTS

| CN | 104002195 A | 8/2014 |
| JP | 2-284841 A | 11/1990 |
| JP | 5-88729 A | 4/1993 |
| JP | 7-51998 A | 2/1995 |
| JP | 7-186012 A | 7/1995 |
| JP | 2003308106 A | 10/2003 |
| WO | 00/012260 A1 | 3/2000 |

OTHER PUBLICATIONS

Office Action in CN Application No. 201610422790.1, dated Mar. 30, 2018, 15pp.

* cited by examiner

MACHINING CONDITION DATA

| CONDITION NO. | COOLANT pH | COOLANT CONCENTRATION | ... | MACHINE'S INTERNAL TEMPERATURE | CONSUMPTION FACTOR |
|---|---|---|---|---|---|
| 1 | 6~8 | 10%~12% | ... | 10°C~12°C | 1.2 |
| 2 | 8~9 | 10%~12% | ... | 10°C~12°C | 1.0 |
| ⋮ | ⋮ | ⋮ | ⋮ | ⋮ | ⋮ |
| N | 10 OR MORE | 30% OR MORE | ... | 30°C OR MORE | 5.0 |

FIG. 7

TOOL DATA

| TOOL NUMBER | TOOL TYPE | TOOL POSITION | TOOL DIMENSIONS ||| REMAINING TOOL LIFE ||
|---|---|---|---|---|---|---|---|
| | | | TOOL LENGTH | TOOL DIAMETER | ... | REMAINING OPERATING LIFE | REMAINING NUMBER OF TIMES OF USE |
| 1 | END MILL | 1 | 100.0mm | 10.0mm | ... | 50.0 SECONDS | - | ... |
| | | 2 | 80.0mm | 15.0mm | ... | 30.0 SECONDS | - | ... |
| 2 | TAPPING TOOL | 3 | 70.0mm | 5.0mm | ... | - | 8.0 TIMES | ... |
| | | 4 | 70.0mm | 5.0mm | ... | - | 10.0 TIMES | ... |
| ... | ... | ... | ... | ... | ... | ... | ... | ... |

PARAMETER-BASED CONTROLLER FOR MANAGING TOOL LIFE CONSIDERING CHANGE IN MACHINING CONDITIONS

RELATED APPLICATIONS

The present application claims priority to Japanese Patent Application Number 2015-120194, filed Jun. 15, 2015, the disclosure of which is hereby incorporated by reference herein in its entirety.

BACKGROUND OF THE INVENTION

1. Field of the Invention

The present invention relates to a numerical controller, and particularly to a numerical controller having the function of managing the life of a tool based on machining conditions.

2. Description of the Related Art

Generally, in a tool used in a machine tool, the cutting edge thereof wears and cutting resistance increases with increasing machining time. Advanced wear decreases machining accuracy, and a predetermined machining accuracy required for a workpiece cannot be maintained. Thus, the tool reaches the end of the life thereof.

As prior art techniques relating to tool life, Japanese Patent Application Laid-Open No. 2003-308106 and International Publication No. WO2000/012260 disclose techniques in which a tool life to be consumed when a machining program is executed is estimated based on machining conditions and the like before machining. Using the above-described prior art technique, an operator who performs machining can avoid the problem that the life of a tool unexpectedly ends during machining by preparing a tool having a life longer than a tool life consumed during machining in a tool magazine in advance.

Tool-life consumption-speed changes in accordance with machining conditions such as coolant concentration, pH, temperature, and machine's internal temperature. Accordingly, in the case where machining conditions assumed when tool life is estimated (that is, before machining start) are different from machining conditions at the time of an actual operation or in the case where machining conditions change during an operation, the tool life is consumed faster than estimated, and the tool life may end during machining. This problem cannot be solved even if the aforementioned techniques disclosed in Japanese Patent Application Laid-Open No. 2003-308106 and International Publication No. WO2000/012260 are used.

SUMMARY OF THE INVENTION

Accordingly, an object of the present invention is to provide a numerical controller which can perform machining control in consideration of tool life in accordance with machining conditions.

A numerical controller according to the present invention machines a workpiece by controlling a machine tool including a tool based on a command of a block read from a machining program. The numerical controller includes a tool data storage section for storing tool data in which the tool and a life of the tool are associated with each other; a machining condition data storage section for storing machining condition data in which machining conditions at time of machining and a consumption factor representing a degree to which the tool consumes the tool life under the machining conditions are associated with each other; a program operation section for controlling the machine tool based on the machining program; a tool usage calculation section for calculating a usage of the tool for each block of the machining program; a consumption factor determination section for determining a consumption factor by referring to the machining condition data storage section based on machining conditions at time of machining performed in accordance with the machining program; and a life consumption-amount calculation section for calculating an accumulated consumption life, which is a tool life consumed before each block, based on the tool usage for each block calculated by the tool usage calculation section and the consumption factor determined by the consumption factor determination section. The program operation section is configured to select, if a command of a block read from the machining program is a tool change command, a tool having a tool life that does not end before a next tool change command, from among tools stored in the tool data storage section, based on the accumulated consumption life.

The consumption factor determination section may be configured to determines, if there is a change in machining conditions during an operation based on the machining program, a latest consumption factor based on the changed machining conditions, and the life consumption-amount calculation section may be configured to recalculate an accumulated consumption life, which is a tool life consumed before each block, based on the latest consumption factor. And the numerical controller may further include a life exhausting block determination section for determining a block of the machining program at which a tool life of a currently-used tool will end if it is estimated, based on the recalculated accumulated consumption life, that the tool life of the currently-used tool will end before the next tool change command, and an operation-stop-block determination section for determining a block at which a machining operation can be safely stopped in a section ranging from a block of the machining program currently executed by the program operation section to the block of the machining program determined, by the life exhausting block determination section, to be a block at which the tool life of the currently-used tool ends.

According to the present invention, by changing to a tool having a necessary tool life in accordance with machining conditions which change in real time, the problem that the tool life unexpectedly ends during machining can be avoided.

Moreover, even in the case where the tool life ends due to a great change in machining conditions, a machining operation can be safely stopped at a block at which operating time becomes longest.

BRIEF DESCRIPTION OF THE DRAWINGS

The forgoing and other objects and feature of the invention will be apparent from the following description of preferred embodiments of the invention with reference to the accompanying drawings, in which:

FIG. 7 is a view showing an example of a tool data storage section of the present invention;

DETAILED DESCRIPTION OF THE PREFERRED EMBODIMENTS

First, one function (optimum life tool selecting function) of a numerical controller according to the present invention will be described with reference to FIG. 1A.

Various machining conditions such as coolant concentration, pH, temperature, and machine's internal temperature and a consumption factor representing a tool-life consumption-speed under the machining conditions are stored as a machining condition database in internal memory in advance. In the case where a tool change command (T code) is issued during a machining operation based on a machining program, tool usages (cutting time, cutting length, the number of times of drilling or tapping, or the like) are calculated for blocks before a next tool change in the background, and, at the same time, a consumption factor is calculated by measuring machining conditions (coolant concentration, pH, temperature, machine's internal temperature, and the like) and referring to the above-described machining condition database. Then, a tool life to be consumed is calculated from the calculated tool usage and consumption factor. Further, a search for a tool having a tool life longer than the calculated tool life to be consumed is performed, and the current tool is replaced with the searched tool.

Moreover, another function (stop block detection function) of a numerical controller according to the present invention will be described with reference to FIG. 1B.

Figure 1:
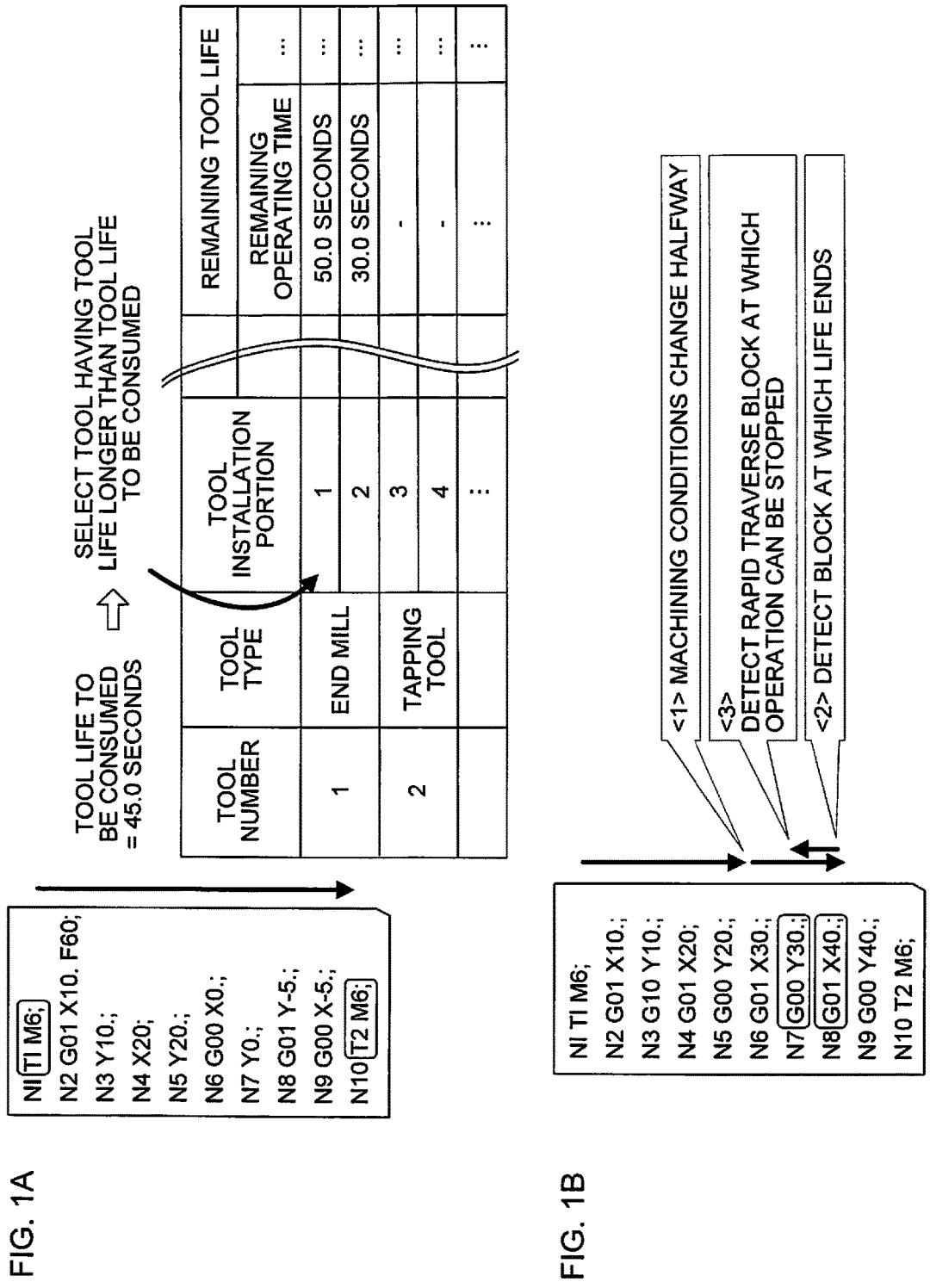
FIG. 1A is a view for explaining the outline of an optimum life tool selecting function of a numerical controller of the present invention.
FIG. 1B is a view for explaining the outline of a stop block detection function of the numerical controller of the present invention.

Machining conditions which are changed by a command of a block, a signal, or the like are measured during a machining operation, and a consumption factor calculated from the changed machining conditions is compared with a consumption factor calculated at the time of the last tool change (see <1> in FIG. 1B). In the case where the consumption factor for the latest measured machining conditions is larger than the consumption factor calculated at the time of the last tool change, a tool life (consumption life) to be consumed at remaining blocks before the next tool change is calculated using the consumption factor for the latest measured machining conditions. Then, in the case where it turns out that the life ends before the next tool change (see <2> in FIG. 1B), the machining operation is continued to the last one of non-cutting blocks (such as rapid traverse blocks or auxiliary functions) existing between the currently-executing block and a block at which the life ends, and the machining operation is suspended at the non-cutting block (see <3> in FIG. 1B).

First, a first embodiment of the numerical controller of the present invention will be described with reference to FIGS. 2 to 7. This numerical controller has an optimum life tool selecting function based on a tool life to be consumed.

Figure 2:
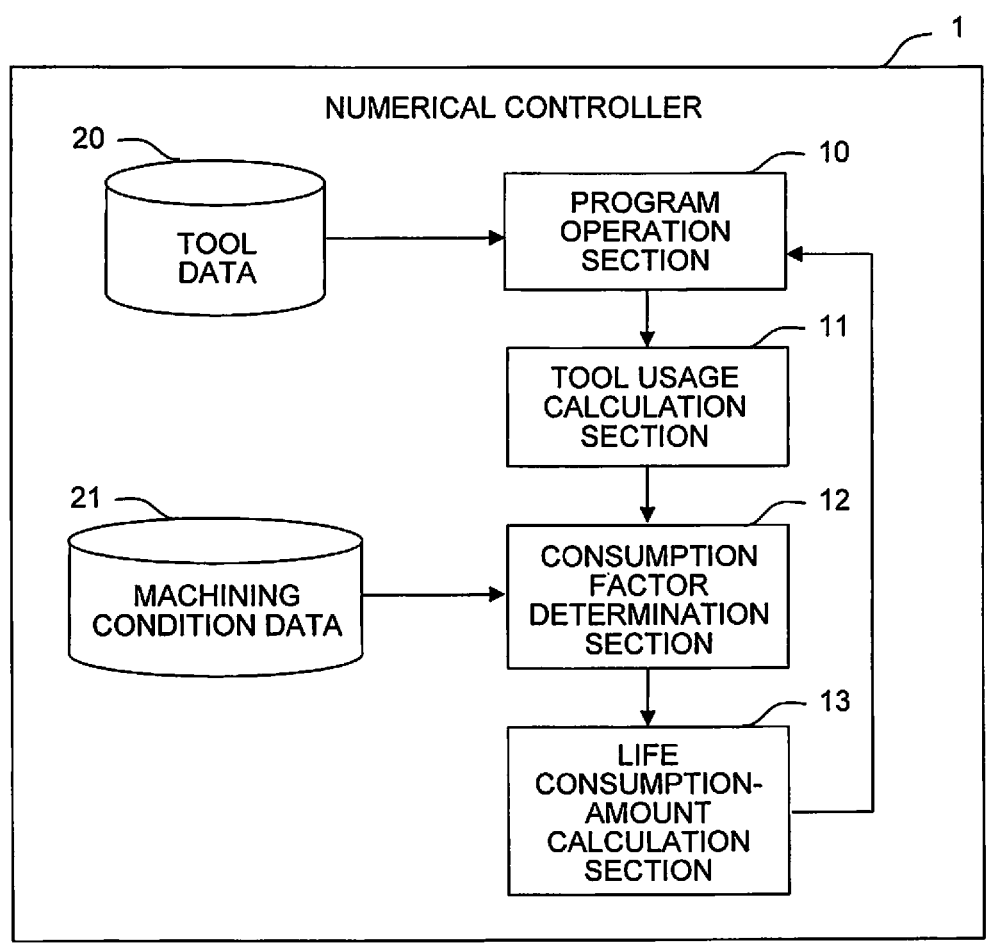
FIG. 2 is a functional block diagram of the numerical controller according to a first embodiment of the present invention.

FIG. 2 is a functional block diagram of the numerical controller according to this embodiment. The numerical controller 1 includes a program operation section 10, a tool usage calculation section 11, a consumption factor determination section 12, a life consumption-amount calculation section 13, a tool data storage section 20, and a machining condition data storage section 21.

The program operation section 10 reads a machining program stored in memory (not shown), and controls a machine tool in accordance with a command of a block of the read machining program. Upon reading a block containing a tool change command (T code command), the program operation section 10 prefetches blocks ranging from the read block to the block containing the next tool change command, and instructs the tool usage calculation section 11 (described later) to calculate a tool life to be consumed during workpiece machining based on commands of the prefetched blocks.

Upon receiving instructions from the program operation section 10, the tool usage calculation section 11 calculates a "tool usage" to be used during workpiece machining based on the command of each block prefetched by the program operation section 10. The "tool usage" is represented by a measured value such as cutting time, cutting length, or the number of times of drilling or tapping depending on tool types.

For example, in the case where the tool is an end mill, a tool usage is measured based on cutting time, cutting length, or the like.

Figure 3:
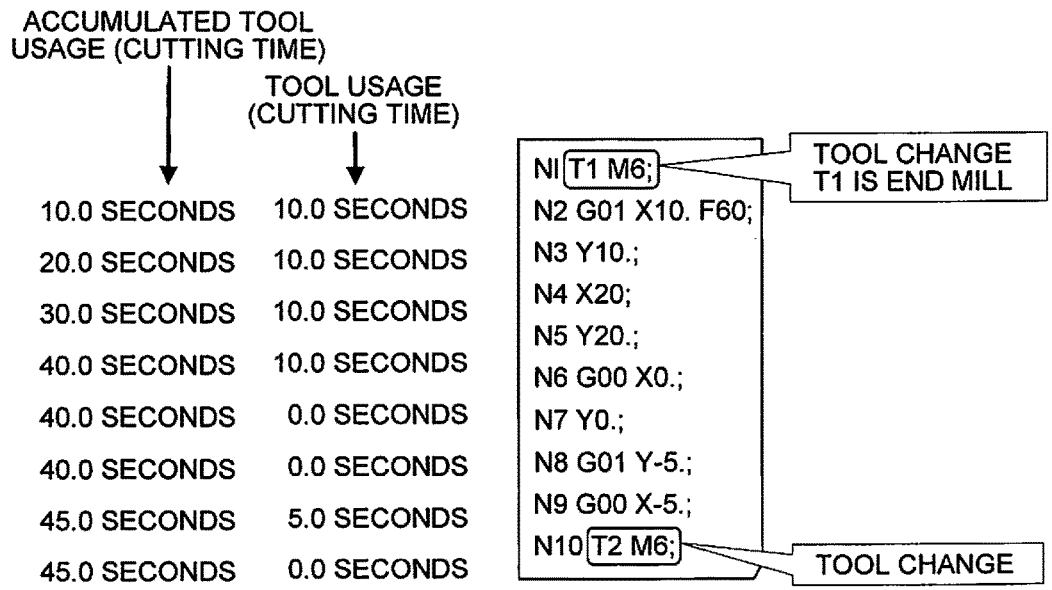
FIG. 3 is a view for explaining a tool usage of an end mill of the present invention.

FIG. 3 shows an example in which a usage of an end mill is measured based on cutting time.

In the case where measurement is performed based on cutting time, cutting time is calculated from coordinate positions through which the tool travels and feedrate for each cutting command (such as G01).

Meanwhile, in the case where the tool is a tapping tool, a tool usage is measured based on the number of times of tapping.

Figure 4:
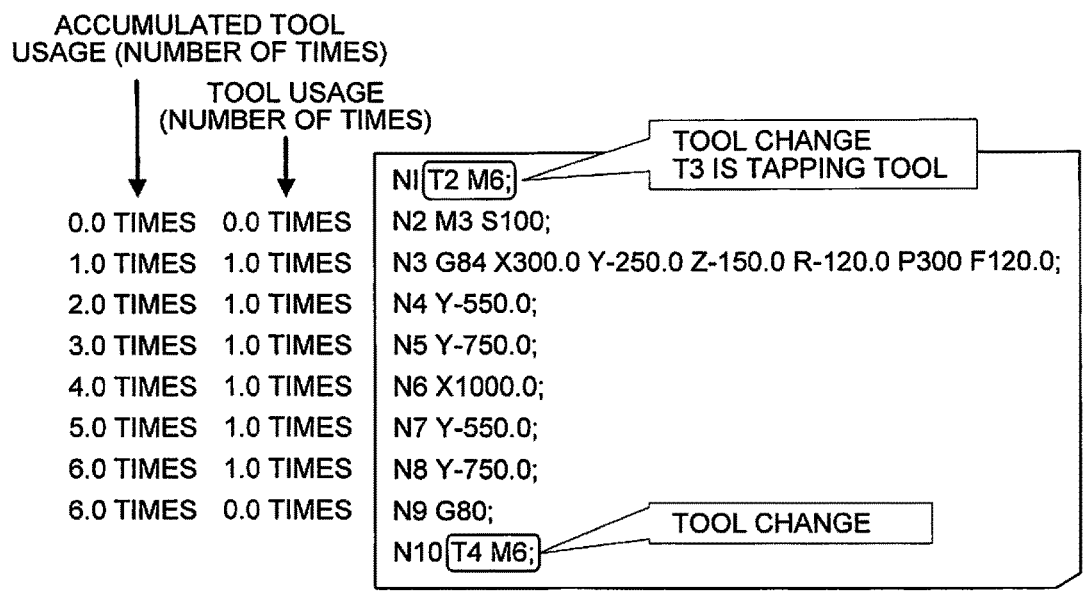
FIG. 4 is a view for explaining a tool usage of a tapping tool of the present invention.

FIG. 4 shows an example in which a usage of a tapping tool is measured based on the number of times of tapping.

In the case where measurement is performed based on the number of times of tapping, the number of times of tapping is counted every time a tapping command (such as G84) is executed.

The consumption factor determination section 12 obtains machining conditions such as the current coolant concentration, pH, temperature, and machine's internal temperature from the numerical controller, peripheral devices or sensors of the machine, or the like, and determines a consumption factor of the tool from the obtained machining conditions, the tool type selected by the tool change command, and machining condition data stored in the machining condition data storage section 21.

Figures 5, 6:
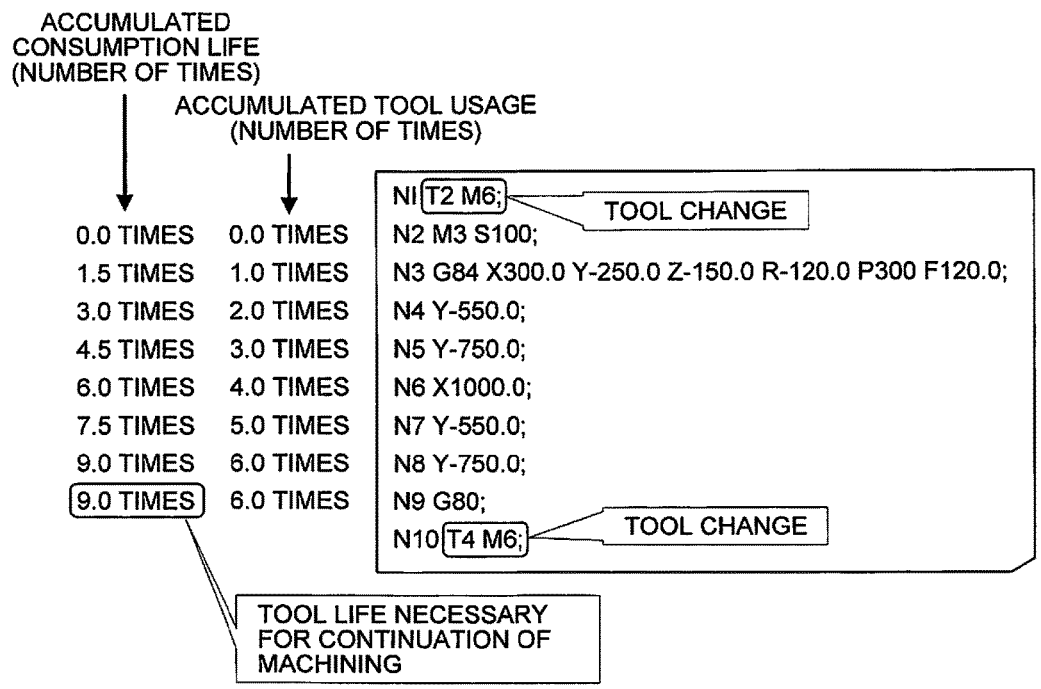
FIG. 5 is a view showing an example of a machining condition data storage section of the present invention.
FIG. 6 is a view for explaining an accumulated consumption life of the present invention.

FIG. 5 shows an example of machining condition data stored in the machining condition data storage section 21 of the numerical controller 1.

The machining condition data storage section 21 stores a plurality of pieces of machining condition data in which machining conditions such as coolant concentration, pH, temperature, and machine's internal temperature are associated with a "consumption factor" representing a tool-life consumption-speed when the tool is used under each of the machining conditions.

The "consumption factor" is 1.0 for a set of reference machining conditions, and becomes larger as machining conditions become more severe (high coolant concentration, high temperature, and the like). The consumption factor for each of the machining conditions may be a ratio of the tool-life consumption-speed under a machining condition to the consumption speed under the reference machining condition. The consumption factor may be determined by experiment or the like in advance, or may be calculated by statistical processing based on information such as machining conditions, material, and shape for each machining operation, acquired by collecting data concerning actual uses of tools used in the past. The consumption factor determined in this way is stored in the machining condition data storage section 21 as machining data for each tool type associated with the machining conditions.

The life consumption-amount calculation section 13 calculates a tool life (consumption life) to be consumed in each of the blocks included in a section from the latest tool change to the next tool change, based on the tool usage for a command in each of the blocks measured by the tool usage calculation section 11 and the consumption factor determined by the consumption factor determination section 12, and accumulates the calculated consumed lives to calculate an accumulated consumption life to be consumed before each of the blocks. The life consumption-amount calculation section 13 estimates a tool life to be consumed in the case where the blocks included in the section are executed in accordance with the following equation (1). It should be noted that the consumption life calculated for each block is stored in an area provided in unillustrated internal memory (such as a RAM).

Tool life to be consumed (consumption life)=tool usage×consumption factor (1)

FIG. 6 is a view showing an example in which a consumption life of a tool in a section between tool changes, in the case where a tapping tool is used, is calculated.

As shown in FIG. 6, the life consumption-amount calculation section 13 calculates an accumulated tool usage at each block based on the tool usage for each command measured by the tool usage calculation section 11. In the case where the consumption factor determined by the consumption factor determination section 12 is 1.5, an estimation can be made that a tool life which corresponds to 9.0 times of tapping will be finally consumed before the next tool change, by multiplying the accumulated tool usage calculated by the life consumption-amount calculation section 13 by 1.5.

The life consumption-amount calculation section 13 notifies the program operation section 10 of the estimated tool life to be consumed before the next tool change. The program operation section 10 which has received a notification about the tool life consumed before the next tool change selects a tool having a tool life longer than the tool life to be consumed before the next tool change, which has been received from the life consumption-amount calculation section 13, from among tools stored in the tool data storage section 20, when a tool is selected from among tools of the same type based on a tool change command (T code command). As a result, the machine tool controlled by the numerical controller can carry out machining without the life of the tool exhausted before the next tool change. It should be noted that in the case where a tool having a tool life longer than the tool life to be consumed before the next tool change is not registered in the tool data storage section 20 at this stage, a notification of the fact that there is no appropriate tool registered may be issued to a user as a warning.

FIG. 7 shows an example of tool data stored in the tool data storage section 20.

As shown in FIG. 7, tool data contains a tool type, data such as tool dimensions, remaining tool life according to tool type, a tool position (in the case of an automatic tool changer), and the like for each tool, which are associated with tool number.

If the program operation section 10 is notified from the life consumption-amount calculation section 13 that consumption life (remaining tool life) in the section is 9 times of tapping at the time of a change to a tapping tool as described with reference to FIG. 6, the program operation section 10 refers to the tool data storage section 20 and selects a tool (tool at tool position 4) which is a tapping tool and which has a remaining tool life of 9 times or more. In such selection of a tool, a tool may be selected with margin corresponding to a predetermined ratio or amount of life.

Thus, in the numerical controller according to this embodiment, consumption life of a tool is estimated not before the start of machining but every time a tool change is performed, and a tool having a tool life longer than the estimated consumption life is selected. Accordingly, it is possible to avoid the problem that the tool life unexpectedly ends during machining.

Next, a second embodiment of the numerical controller according to the present invention will be described with reference to FIGS. 8 and 9.

The numerical controller according to the aforementioned first embodiment has the function of estimating a tool life consumed before a next tool change based on machining conditions at the time of a tool change and selecting a tool having a remaining tool life longer than the estimated consumption life. Meanwhile, the numerical controller according to this second embodiment has the function of safely stopping at a block at which operating time becomes longest even in the case where the tool life ends during machining due to a great change in machining conditions.

Figure 8:
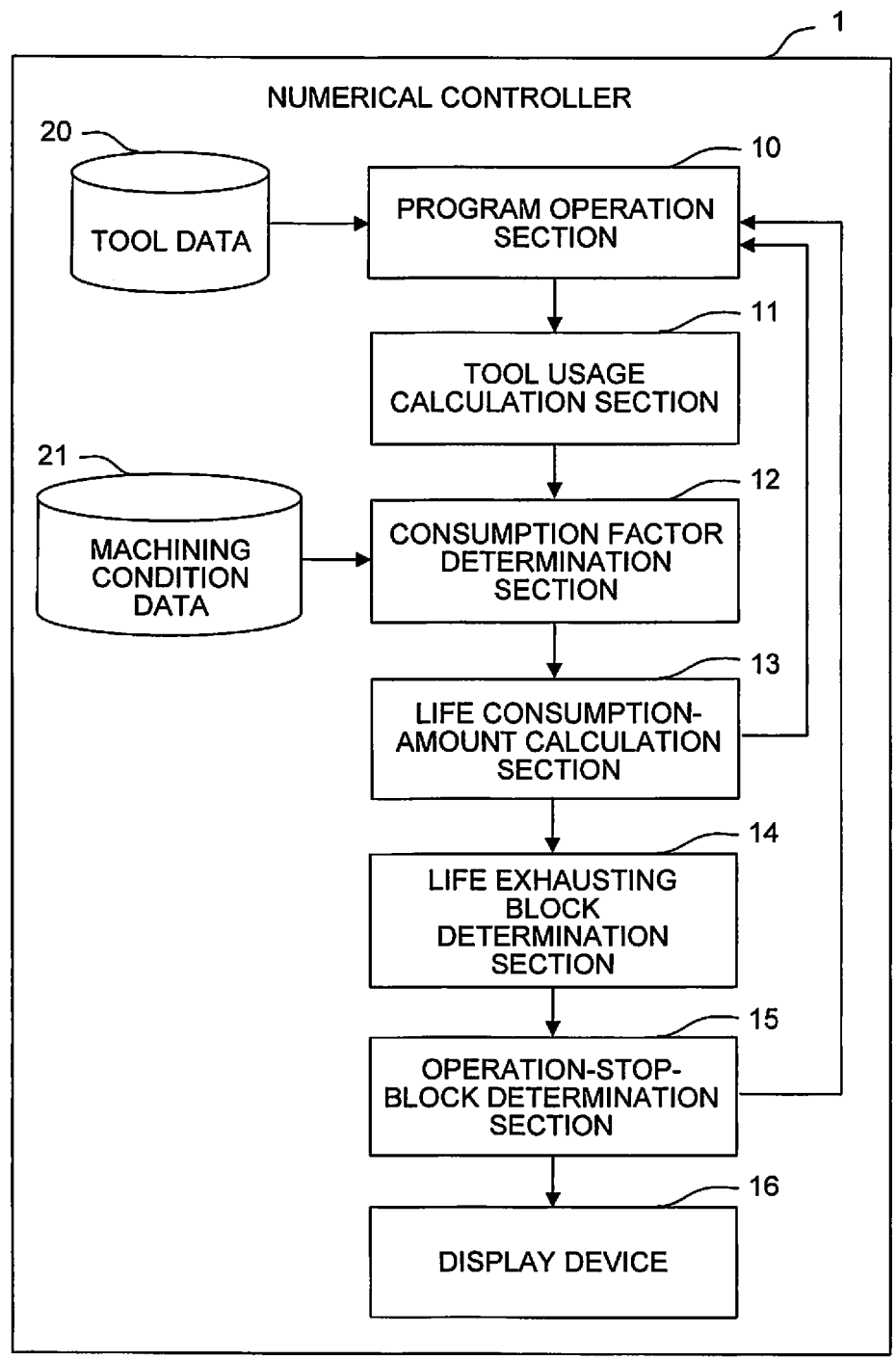
FIG. 8 is a functional block diagram of the numerical controller according to a second embodiment of the present invention.

FIG. 8 is a functional block diagram of the numerical controller according to this embodiment.

The numerical controller 1 includes a life exhausting block determination section 14, an operation-stop-block determination section 15, and a display device 16, in addition to the program operation section 10, the tool usage calculation section 11, the consumption factor determination section 12, the life consumption-amount calculation section 13, the tool data storage section 20, and the machining condition data storage section 21 which are common components with the aforementioned first embodiment (see the functional block diagram of FIG. 2).

The consumption factor determination section 12 obtains machining conditions such as coolant concentration, pH, temperature, and machine's internal temperature from the numerical controller, peripheral devices or sensors of the machine, or the like during a machining operation performed by the program operation section 10, and monitors a change in the obtained machining conditions. If the obtained machining conditions change beyond a predetermined threshold, the consumption factor determination section 12 determines a consumption factor of the tool based on the changed current machining conditions, the tool type selected by a tool change command, and the machining condition data stored in the machining condition data storage section 21, and compares the determined consumption factor with the consumption factor obtained at the time of the last tool change.

Further, if the consumption factor of the tool based on the current machining conditions is larger than the consumption factor obtained at the time of the last tool change, the consumption factor determination section 12 instructs the life consumption-amount calculation section 13 to calculate a consumption life for each block based on the latest consumption factor based on the current machining conditions.

For each block in the section from the currently-executed block to the block of the next tool change, the life consumption-amount calculation section 13 reads the consumption life for each block, which is recorded in the internal memory at the time of a tool change by the tool usage calculation section 11, and recalculates a consumption life for a command of each block based on the latest consumption factor determined by the consumption factor determination section 12 in accordance with the following equation (2).

$$\text{Consumption life for each remaining block} = \text{consumption life for each block at the time of tool change} \times (\text{the latest consumption factor} \div \text{consumption factor at the time of tool change}) \quad (2)$$

Moreover, the life consumption-amount calculation section 13 adds the consumption life for each block recalculated using the above-described equation (2) to the accumulated consumption life for a block one block before the currently-executed block to recalculate an accumulated consumption life consumed before each block after the currently-executed block, and instructs the life exhausting block determination section 14 to estimate a block at which the life of the currently-used tool ends.

Based on the accumulated consumption life recalculated by the life consumption-amount calculation section 13, the life exhausting block determination section 14 determines whether the accumulated consumption life before the block of the next tool change is not more than the tool life of the currently-used tool. If the accumulated consumption life before the block of the next tool change is not more than the remaining tool life of the currently-used tool, the life of the currently-used tool does not end before the next tool change. Accordingly, machining is continued without any change.

Figure 9:
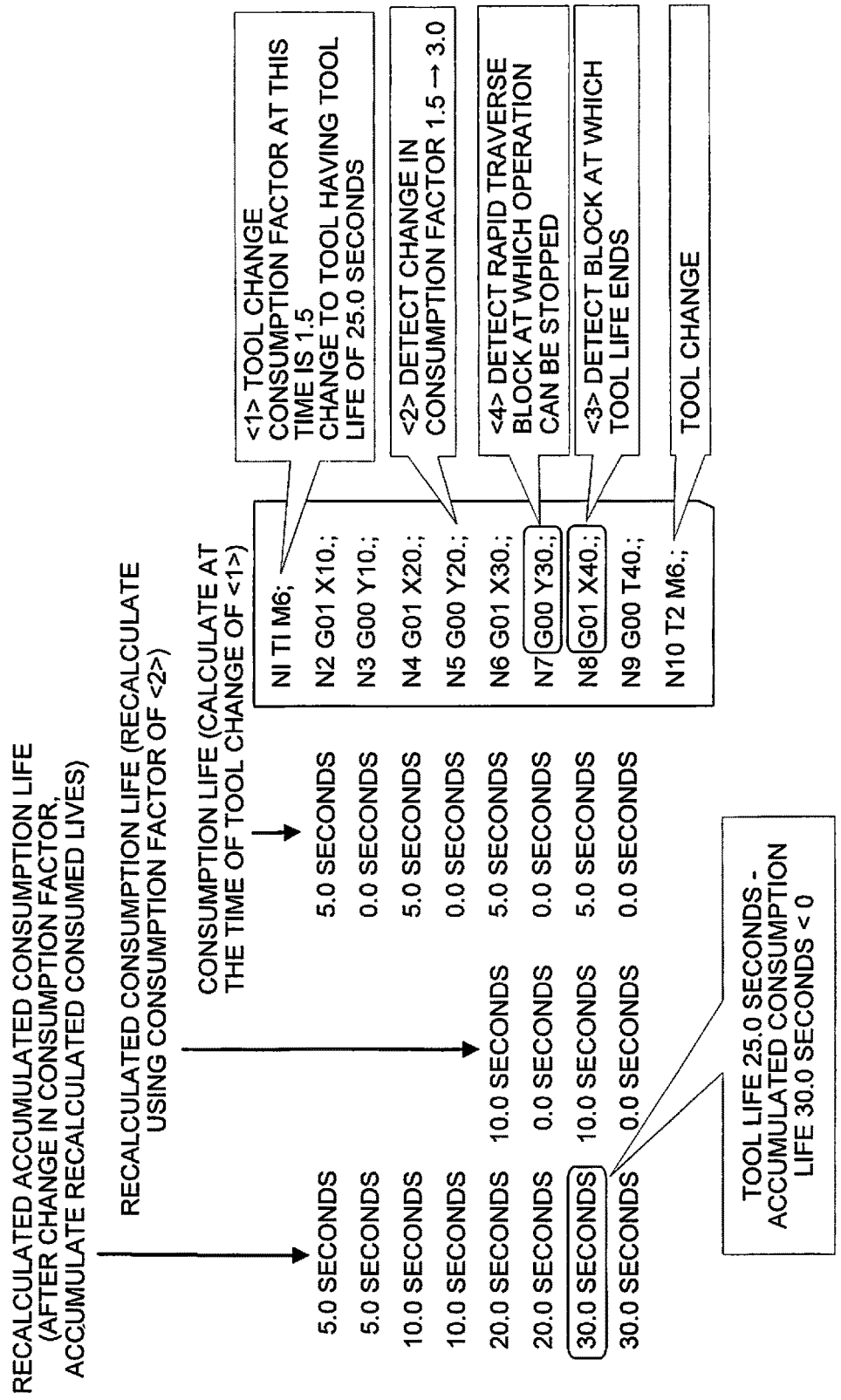
FIG. 9 is a view for explaining the operation of the numerical controller according to the second embodiment of the present invention.

If the accumulated consumption life before the block of the next tool change is more than the tool life of the currently-used tool, that is, the tool life of the currently-used tool ends before the next tool change, on the other hand, the life exhausting block determination section 14 compares the accumulated consumption life with the tool life of the currently-used tool in order from the currently-executed block as shown in FIG. 9 to determine a block at which the tool life of the currently-used tool ends, and instructs the operation-stop-block determination section 15 to determine a block at which an operation is to be stopped, based on the determined block.

The operation-stop-block determination section 15 traces back the sequence of execution of blocks from the block which is determined, by the life exhausting block determination section 14, to be a block at which the tool life of the currently-used tool ends, determines a non-cutting block such as a rapid traverse block as an operation stop block, and instructs the program operation section 10 to stop the machining operation at the determined operation stop block. The operation-stop-block determination section 15 further highlights a warning message, the block at which the life ends, and the operation stop block on the display device 16 to provide information to that effect to a user.

FIG. 9 is a view for explaining the operation of the numerical controller 1 for the case where the consumption factor has changed from 1.5 to 3.0.

In FIG. 9, the consumption factor is determined to be 1.5 from machining conditions at the time of a tool change, and a tool having a tool life of 25.0 seconds is selected because a tool life consumed before the next tool change is 20.0 seconds (see <1> in FIG. 9). After that, the consumption factor determination section 12 detects a change in machining conditions, and determines the latest consumption factor to be 3.0 based on the changed machining conditions (see <2> in FIG. 9). Since the determined latest consumption factor is larger than the consumption factor determined at the time of the last tool change, a tool life to be consumed is recalculated by the life consumption-amount calculation section 13.

Then, the life exhausting block determination section 14 estimates that the tool life (25 seconds) of the currently-used tool will end before the next tool change, and determines a block at which the life of the currently-used tool ends (see <3> in FIG. 9). After that, the operation-stop-block determination section 15 determines an operation stop block at which the machining operation can be safely stopped (see <4> in FIG. 9), and instructs the program operation section 10. Thus, the machining operation can be safely stopped at the operation stop block.

As described above, with the numerical controller according to this embodiment, even in the case where the tool life unexpectedly ends during machining due to a great change in machining conditions, a machining operation can be safely stopped at a block at which operating time becomes longest.

While embodiments of the present invention have been described above, the present invention is not limited only to the above-described examples of embodiments, but can be carried out in various aspects by making appropriate modifications thereto.

For example, though examples of an end mill and a tapping tool have been described in the aforementioned embodiments, the present invention can be applied to other tools by managing a tool usage and a tool life appropriate for the tool.

The invention claimed is:

1. A numerical controller for machining a workpiece by controlling a machine tool including a tool based on a command of each of a plurality of blocks read from a machining program, the numerical controller comprising:
   a tool data storage section for storing tool data in which the tool and a life of the tool are associated with each other;
   a machining condition data storage section for storing machining condition data in which machining conditions at time of machining and a consumption factor representing a degree to which the tool consumes the tool life under the machining conditions are associated with each other;
   a program operation section for controlling the machine tool based on the machining program;
   a tool usage calculation section for calculating a usage of the tool for each of the plurality of blocks of the machining program;
   a consumption factor determination section for determining a consumption factor by referring to the machining condition data storage section based on machining conditions at time of machining performed in accordance with the machining program; and
   a life consumption-amount calculation section for calculating an accumulated consumption life, which is a tool life consumed before each of the plurality of blocks based on the tool usage for each of the plurality of blocks calculated by the tool usage calculation section and the consumption factor determined by the consumption factor determination section, wherein the program operation section is configured to, in response to a block read from the machining program containing a tool change command, read a machining command of each of subsequent blocks between the block containing the tool change command and a block containing a next tool change command in advance of execution of the machining command, and select a tool having a tool life that does not end before the block containing the next tool change command, from among tools stored in the tool data storage section, based on the accumulated consumption life.

2. The numerical controller according to claim 1, wherein the consumption factor determination section is configured to determine, in response to a change in machining conditions during an operation based on the machining program, a latest consumption factor based on the changed machining conditions, the life consumption-amount calculation section is configured to recalculate an accumulated consumption life, which is a tool life consumed before each of the plurality of blocks, based on the latest consumption factor, and the numerical controller further includes a life exhausting block determination section configured to determine a block of the machining program at which a tool life of a currently-used tool will end in response to an estimation, based on the recalculated accumulated consumption life, that the tool life of the currently-used tool will end before the next tool change command, and an operation-stop-block determination section configured to determine a block at which a machining operation is safely stoppable in a section ranging from a block of the machining program currently executed by the program operation section to the block of the machining program determined, by the life exhausting block determination section, to be a block at which the tool life of the currently-used tool ends.

3. The numerical controller according to claim 2, wherein the operation-stop-block determination section is configured to determine the block at which a machine operation is to be stopped where an operable time is maximum.

4. The numerical controller according to claim 1, wherein the machining condition comprises one or more of coolant concentration, pH, temperature and machine's internal temperature.

\* \* \* \* \*